United States Patent [19]

Siebert

[11] Patent Number: 4,652,151
[45] Date of Patent: * Mar. 24, 1987

[54] BEARING ASSEMBLY

[76] Inventor: Craig Siebert, Sleepy Hollow Country Club, Briarcliff Manor, N.Y. 10510

[*] Notice: The portion of the term of this patent subsequent to Dec. 24, 2002 has been disclaimed.

[21] Appl. No.: 806,684

[22] Filed: Dec. 9, 1985

[51] Int. Cl.$^4$ .................... F16C 33/16; F16C 35/02
[52] U.S. Cl. .................................................. 384/434
[58] Field of Search ............ 384/434, 432, 191, 191.3, 384/191.4; 308/57, 54, 53

[56] References Cited

U.S. PATENT DOCUMENTS

| 629,180 | 7/1899 | Taylor | 384/434 |
|---|---|---|---|
| 1,449,174 | 3/1923 | Gregg | 308/57 |
| 2,872,253 | 2/1959 | Foote et al. | 384/434 |
| 2,888,301 | 5/1959 | Bachman | 308/54 |
| 4,560,290 | 12/1985 | Siebert | 384/434 |

Primary Examiner—Lenard A. Footland
Attorney, Agent, or Firm—Jordan B. Bierman

[57] ABSTRACT

A bearing assembly has a mounting bracket with an annular cut-out for supporting a bushing cradle with outer walls of corresponding angular shape for supporting a correspondingly shaped half block bushing. A half block bushing is used to support a roller journaled thereon. The half block form of the bushing permits convenient disassembly of the bearing for replacement of parts, and has longer and more stable wear characteristics. The outer walls of the bushing cradle are preferably trapezoidal to prevent rotational movement of the bushing relative to the cradle and mounting bracket, and to permit easy removal of the bushing during replacement. A spring metal clip lock is used to retain the bushing and cradle in position relative to the mounting bracket by spring pressure.

15 Claims, 9 Drawing Figures

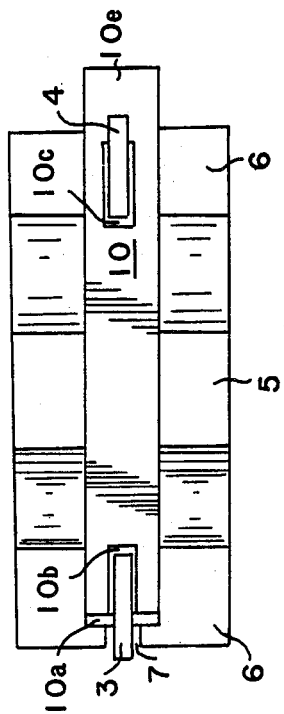
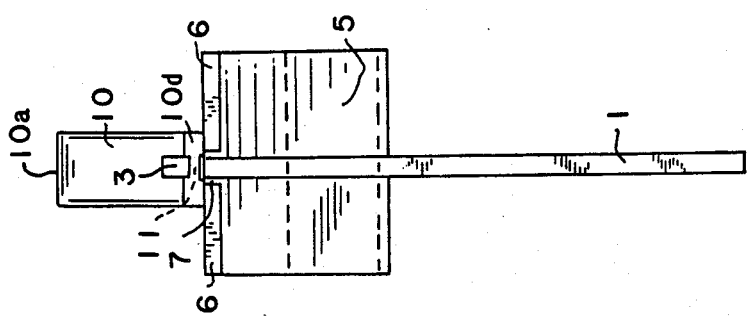
FIG. 4
FIG. 3

FIG.5a
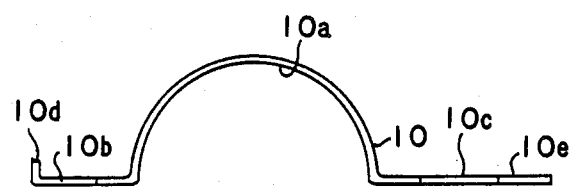
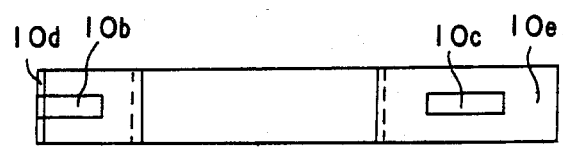
FIG.5b

BEARING ASSEMBLY

The invention relates to a bearing assembly for supporting rotating shafts and rollers and, more particularly, to a bearing assembly which can easily be removed and replaced.

BACKGROUND ART

In industrial and manufacturing processes, many products require heating at high temperatures, such as 300° F. to 1000° F., in order to drive off water vapor. Products such as plywood, veneer board, ceiling tile, and gypsum board require drying in large volumes, which is often accomplished in continuously fed, roller-type drying ovens. Typically, the oven temperature is held constant, while the boards are continuously fed through the oven on powered rollers.

Such powered rollers conventionally are held in position by bearing assemblies mounted on an oven frame. Because the oven temperatures are too high for oil or grease lubricated bearings, self-lubricating carbon/graphite bearings are normally used. Because such bearings require periodic replacement, the carbon/graphite material is usually press-fit into a steel sleeve in the form of a replaceable cartridge. The replaceable cartridge is designed to be locked into the bearing assembly with a spring or wire clip, so that a replacement can be made quickly without having to remove nuts and bolts. On the driven end of the rollers, the replaceable cartridge conventionally is split into two halves which can be taken apart during replacement, thus avoiding the need to remove the roller drive chain and sprocket. However, because the steel sleeve and carbon/graphite bushing are split, it is not possible to press-fit the bushing into the steel sleeve. As a result, the carbon/graphite bushing is not held securely and can turn with the journal. Turning with the journal causes the outside circumference of the carbon/graphite bushing to wear and eventually the bushing will fall out of the sleeve. The present invention is an improvement over our co-pending patent application Ser. No. 646,842, now U.S. Pat. No. 4,560,290, filed 9-4-84.

DISCLOSURE OF THE INVENTION

It is therefore a principal object of the invention to provide a simplified form of replaceable bearing assembly, and to improve the wear life of the replaceable cartridge. In accordance with the invention, a bearing assembly comprises a bushing cradle for mounting a half block bushing on a bracket, and means for retaining the bushing in the cradle and/or on the frame. The cradle has an angular shape which fits into a corresponding angular cut-out in the bracket for mounting the bushing and cradle therein and preventing rotation of the bushing and cradle relative to the frame. In a preferred embodiment of the invention, the cradle has outside walls in the form of a rectangle or trapezoid.

The mounting bracket has a hook-type opening in one of the upwardly extending mounting legs and a notch in the other upwardly extending mounting leg for retaining means, preferably in the form of a spring metal clip lock with a semi-circular arch, which is removeably secured through the hook-type opening and presses down on the sides of the cradle and locks onto the notch. The cradle fits in the cut-out of the bracket and has lateral flanges on each side having slots into which upwardly extending mounting legs of the bracket fit. The cradle is also prevented from rotation or longitudinal movement by a tab on the bracket which fits into a corresponding recess in the bottom of the cradle. Similarly, the bushing is held in place axially by a protrusion on the lower wall of the cradle which fits into a corresponding slot in the bottom of the bushing. The bushing is held in place in the cradle by the weight of the roller and by the spring clip lock. The clip lock has an elongated hole portion at each end. One elongated hole engages with the hook-type opening of the upwardly extending mounting leg on one side of the bracket and is securely held in place when the cradle is fitted onto the bracket. A second elongated hole pivotally locks to a closed position onto the notch of the other upwardly extending mounting leg at the other side of the bracket. When pressure is exerted on the top of the semi-circular arch, the clip lock resiliently distorts so that it stretches and the elongated holes move farther apart from each other. The second elongated hole is then capable of fitting over the mounting leg and engaging with the notch.

The bearing assembly of the invention will not rotate with the journal because of its angular shape. Further, the bushing will not fall out of its holder, even if worn, because of the spring pressure of the clip lock. Carbon/graphite material can be saved because the top half of the bushing may be omitted, and more carbon/graphite material is available for wear in the bottom half block under the journal. The half block bushing is easier to replace because it has no metal sleeve into which it must be press-fitted, and because replacement requires simply removing the worn bushing by opening the spring metal clip lock.

Opening the clip lock is accomplished in essentially the same manner as closing the clip lock; namely, by exerting manual pressure on the top of the semi-circular arch portion, the clip lock stretches outwardly to the sides so that the second elongated hole portion no longer engages with the notch or contacts the mounting leg, and is easily pivoted to the open position.

BRIEF DESCRIPTION OF THE DRAWINGS

The above features and the further advantages of the invention are described in detail below in conjunction with the accompanying drawings, of which:

FIG. 3 is a side elevational view of the bearing assembly;

FIG. 4 is a plan view of the assembly as shown in FIG. 1.

FIG. 5 is a plan view of the spring metal clip of the present invention;

DETAILED DESCRIPTION OF THE PREFERRED EMBODIMENTS

Figure 1:
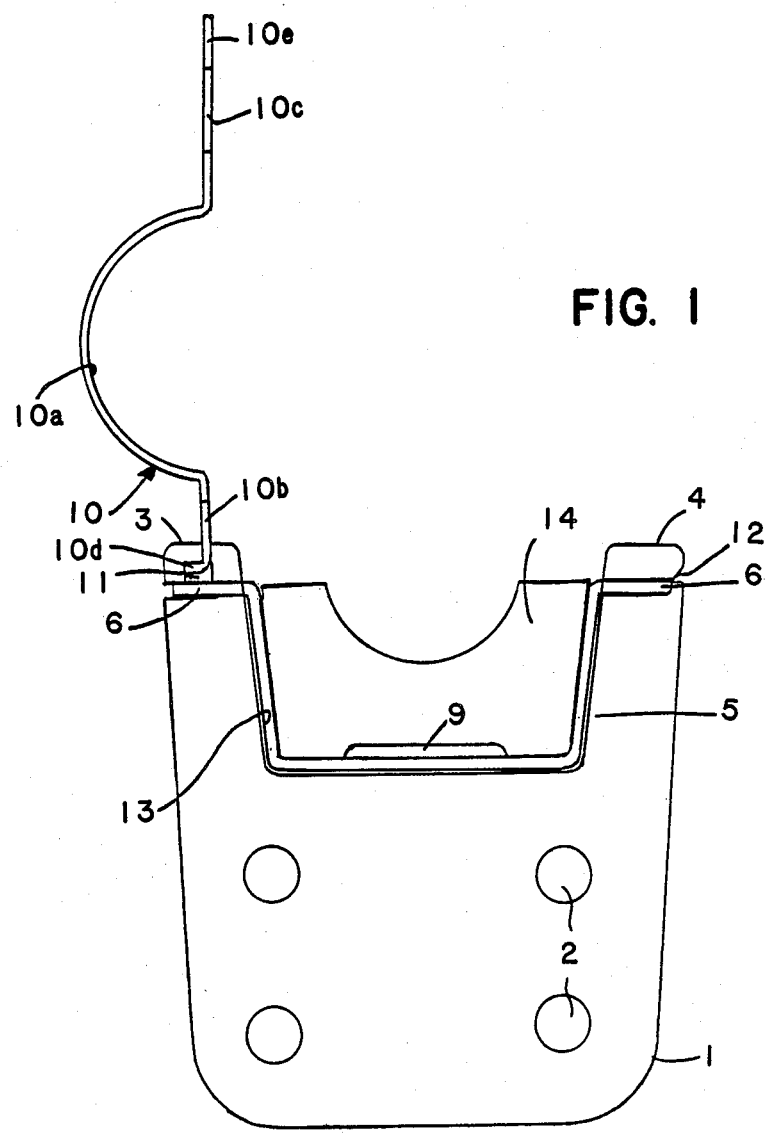
FIG. 1 is a front sectional view of the bearing assembly in accordance with the present invention.
Figure 2:
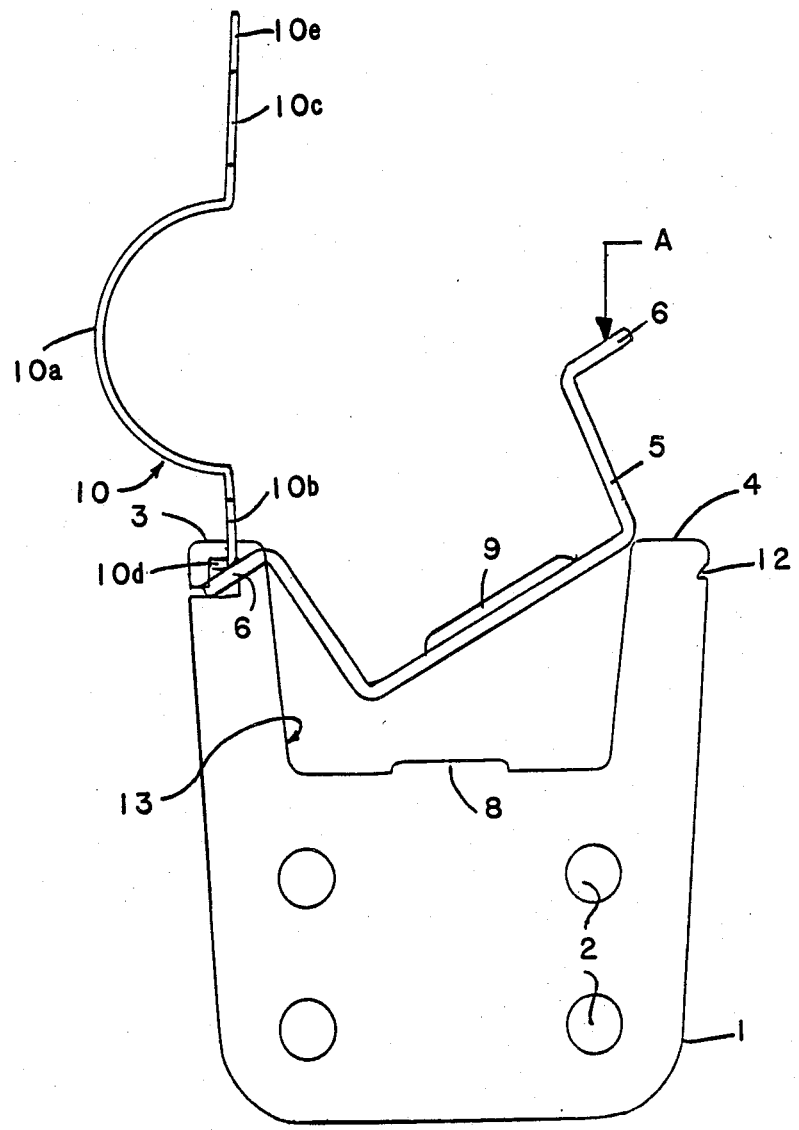
FIG. 2 is a front sectional view of the bearing assembly wherein the cradle is dislodged from the bracket.

Frame or mounting bracket 1 has a lower section with mounting holes 2 for securing bracket 1 to a conventional dryer oven roller frame (not shown). The upper portion of bracket 1 has first and second upwardly extending mounting legs 3 and 4 and a rectangular or trapezoidal cut-out section in the center part thereof generally indicated by reference numeral 13.

A half block bushing 14 rests snugly in cradle 5, which has a shape corresponding to bushing 14 and cut-out 13 of bracket 1. At the upper ends of cradle 5 are laterally extending flanges 6, which have slots 7 for receiving legs 3 and 4 to secure cradle 5 to bracket 1. The fit of the walls of cradle 5 within cut-out 13 fixes its position in the downward direction and prevents its rotation under the force of the turning roller. Protrusion 8 on bracket 1 located in a central portion of cut-out 13 fits into a corresponding indentation 9 in the lower wall of cradle 5, and indentation 9 is inserted into a corresponding central slot formed in the bottom wall of the bushing.

Spring metal clip lock 10 is an integral length of metal strip formed with semi-circular arch section 10a and elongated hole portions 10b and 10c which are secured into hook-type opening 11 and angular notch 12 formed in mounting legs 3 and 4, respectively, of mounting bracket 1. The flat ends of semi-circular arch portion 10a rest upon the top of the bushing 14 with a spring-biased force when clip lock 10 is secured in place. Arch portion 10a provides sufficient clearance so as not to contact the journal supported on the bushing, and is adapted to retain the journal on the bushing 14 in the event of any unusual vibrations or vertical movements. Elongated hole portion 10b has a 90° bend 10d at the end of the hole which is inserted through hook-type opening 11 formed in first mounting leg 3 of mounting bracket 1 and is securely held in place when cradle 5 is fitted into mounting bracket 1, as shown in FIG. 1. Elongated hole portion 10c locks onto angular notch 12 of second mounting leg 4 when clip lock 10 is pivoted to a closed position and manual pressure is exerted on the top of semi-circular arch 10a. This pressure causes resilient distortion in clip lock 10 so that it stretches and elongated holes 10b and 10c move farther apart from each other. The outward movement of elongated hole 10c enables it to fit over and around second mounting leg 4 to engage with notch 12. Tab 10e extends out from the point where hole 10c engages with notch 12. The clip lock as a whole is retained in pressing contact with lateral flanges 6 of cradle 5 and the top of bushing 14 by the spring force of the clip lock. When it is desired to remove clip lock 10 for replacement of parts of the bearing assembly, manual pressure is again exerted on the top of semi-circular arch 10a, causing clip lock 10 to stretch outwardly to the side so that elongated hole 10c no longer engages with notch 12 or contacts second mounting leg 4. Clip lock 10 is then easily pivoted to an open position.

Additionally, due to the angular design of notch 12, clip lock 10 is easily released from its closed position by exerting manual pressure on the bottom of tab 10e of clip lock 10. This pressure causes elongated hole portion 10c and tab 10e to slide up and out the angled side of notch 12 so that it disengages with the notch and pivots away from second mounting leg 4.

It is understood that when the journal, retained on the bushing by clip lock 10, vibrates or moves in a vertical direction, the journal will exert pressure on the bottom of semi-circular arch 10a. However, clip lock 10 will not normally open due to this bottom pressure as pressure in this direction will cause elongated hole portions 10b and 10c to move closer together, thereby maintaining fixed contact with hook-type opening 11 and notch 12, respectively. However, as excessive retention may damage the vibrating journal, it is preferable to design clip lock 10 of such strength so that it will break, under a specified amount of force exerted by the journal, before the journal is damaged. Therefore, although clip lock 10 is easily releasable, it will not release accidentally but will yield to excessive journal pressure.

Figure 6:
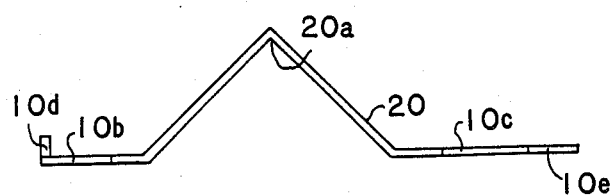
FIG. 6 is a front sectional view of the spring metal clip lock of a second embodiment.
Figure 7:
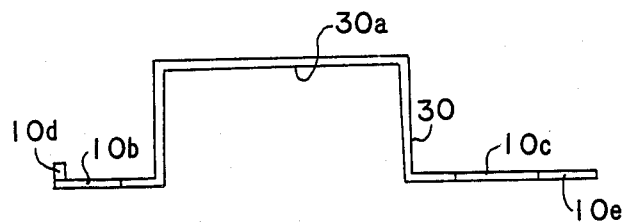
FIG. 7 is a front sectional view of the spring metal clip lock of a third embodiment.

Other shapes of spring metal clip locks are also possible, as shown in FIGS. 6 and 7. The semi-circular arch section 10a of FIG. 4 can be replaced by a triangular or pointed section 20a (FIG. 6), or a rectangular or square section 30a (FIG. 7). The other components of the clip lock (i.e. elongated holes, 90° bend, tab, etc.) remain the same, and the clip lock opens and closes in the same manner heretofore, namely, by exerting manual pressure on the top of pointed section 20a or square section 30a so that the elongated holes move farther apart from each other.

Figure 8:
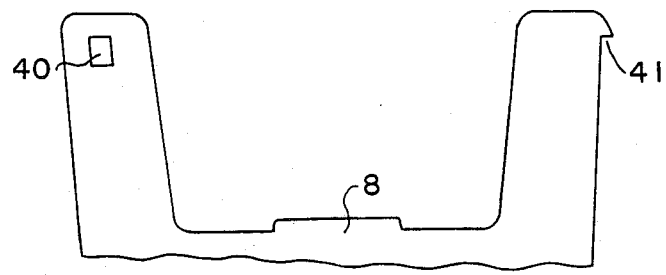
FIG. 8 is a fragmentary front sectional view of another embodiment of the mounting bracket of the present invention.

Other designs of means for securing the spring metal clip lock are possible, as shown in FIG. 8. Hook-type opening 11 of FIG. 1 can be replaced by hole 40 if the spring metal clip lock is not desired to be removable from mounting bracket 1. Additionally, notch 12, as shown in FIG. 1, can be replaced by overhanging lip 41. Opening and closing of the clip lock is carried out in the same manner as heretofore; namely, by exerting pressure on the top of the arched, pointed or square section of the clip lock. However, the clip lock will not be releasable from its closed position by upward pressure on tab 10e due to the perpendicular design of overhanging lip 41.

It is desirable to use cradle 5 since it holds the half block bushing 14 securely wedged in compression and helps prevent cracking of the carbon/graphite material. The tapered shape of the bushing 14 and cradle 5 insures that the bushing can be easily removed from the mounting bracket for replacement. The interlocking of mounting legs 3 and 4 of mounting bracket 1 in slots 7 of lateral flanges 6 of cradle 5 allows the assembly to be self-aligning in the horizontal and vertical directions. Protrusion 8 of mounting bracket 1 and indentation 9 of cradle 5 also insure that the assembly is secured stably in the horizontal as well as lateral directions.

The clip lock secures the bearing assembly and allows for convenient disassembly and replacement of the bushing or other parts. In addition, the design of the above described clip lock allows it to remain secured at one end to mounting bracket 1 even during a replacement operation. Furthermore, the bearing assembly of the present invention allows for decreased plant overhead costs by nearly eliminating plant shutdown time required for changing worn roller bushings. A bushing 14 mounted on the bearing assembly of the invention requires only minutes to change. This is true even if the bearing is in a awkward position or difficult to reach.

Figure 9:
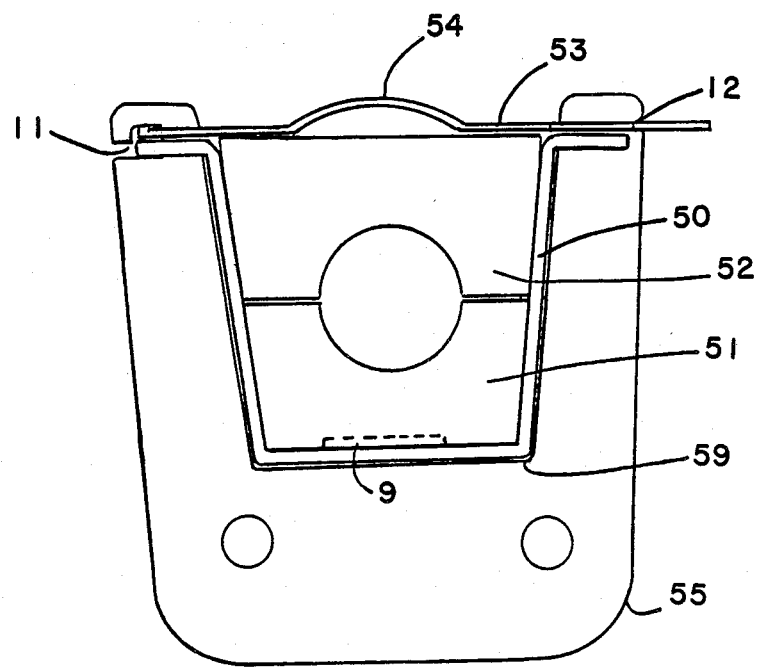
FIG. 9 is a front sectional view of another embodiment of the bearing assembly of the present invention.

Another form of the bearing assembly according to the present invention is shown in FIG. 9. In this form of the bearing assembly, trapezoidal cut-out 59 of mounting bracket 55 is large enough to hold two half-block bushings 51 and 52 supported by a cradle 50. Bushing 51 is of angular shape and is retained by the side and lower walls of cradle 50 and bottom indentation 9 of cradle 50. Bushing 52 advantageously may be the inverted form of bushing 51 and is correspondingly shaped to fit into cradle 50. Bushing 52 rests upon bushing 51 and is firmly held in place by the compressive force of spring clip lock 53 upon the top walls of bushing 52. Spring clip lock 53 opens and closes in the same manner as heretofore except that the central portion 54 of clip lock 53, where manual pressure is exerted, is of slightly bowed shape. Additionally, as is evident, hook-type opening 11 and notch 12 can be replaced by hole opening 40 and overhanging lip 41, as shown in FIG. 8.

The bearing assembly of the invention has significant advantages in ease and convenience of manufacture and replacement. Use of the half block bushing eliminates the need for an upper half as compared to a split bushing. The bearing assembly of the invention is self-aligning and continues to be useable and stable despite prolonged wear. The half block form is also stable under compression by the weight of the journal and by the retaining walls of the bushing cradle. More carbon/graphite material can be made available for wear under the journal, for example, over 0.5 inches as compared to about 0.25 inches for conventional split bushings.

Moreover, the open thrust face of the bushing allows it to be constructed as long as the roller frame design will permit. Longer bushings reduce the load per square inch of journal and increase wear life. The open thrust face also simplifies the manufacture of the half block bushing and reduces length tolerance requirements. The design of the clip lock of the described bearing assembly provides a simple means of retaining the bushing in position, and for quickly and easily disassembling the bearing for replacement of any component thereof.

The above described embodiments are merely illustrative of and not intended to limit the scope of the invention. Various modifications and substitutions of elements, materials, and order or position of elements may be made without departing from the spirit of the invention. All such modifications and variations are intended to be encompassed within the invention as defined in the following claims.

What is claimed is:

1. A bearing assembly, of the type to be secured to a frame for supporting a journal, comprising:
   a mounting bracket provided with first and second mounting legs, upwardly extending from each side thereof, defining an angular cut-out, and means for attaching said bracket to the frame;
   a bushing cradle, for supporting at least one half block bushing, having walls defining a recess, wherein said walls are of corresponding shape to said angular cut-out and adapted to fit between said legs; and
   removable retaining means for securing said cradle in position relative to said bracket comprising a spring clip lock consisting of a resilient strip having a bent central portion providing clearance over a journal, and wherein pressure exerted on the top of said bent central portion causes resilient distortion and elongation of said clip lock so that a first and second end of said clip lock move farther apart from each other, whereby said spring clip lock is capable of being released and pivoted into an open or closed position.

2. The bearing assembly of claim 1 wherein said cradle has outwardly extending flanges on two sides, each flange having a slot onto which one of said upwardly extending mounting legs is interlocked to secure said cradle in position relative to said bracket.

3. The bearing assembly of claim 2 wherein said first upwardly extending mounting leg has a hook-type opening formed therein adjacent the position of said lateral flanges, and wherein said second upwardly extending mounting leg has a notch formed therein adjacent the position of said lateral flanges, and wherein said ends of said spring metal clip lock interlock with said hook-type opening and said notch for retaining said cradle in position relative to said mounting bracket.

4. The bearing assembly of claim 3 wherein said first and second ends of said spring metal clip lock have first and second laterally extending elongated hole portions, respectively, for insertion above and around said first and second mounting legs, respectively, said hole portions being positioned to exert spring pressure on said cradle.

5. The bearing assembly of claim 4 wherein said first laterally extending elongated hole portion has a bend at an end of said first hole portion, wherein said bend is inserted through said hook-type opening of said first mounting leg and is securely held in place when said cradle is fitted onto said mounting bracket and wherein said second laterally extending hole portion fits above and around said second mounting leg and locks onto said notch when said clip lock is pivoted and pressed down into said closed position.

6. The bearing assembly of claim 5 wherein said spring metal clip lock and said cradle are easily disassembled from said bracket when said clip lock is pivoted to an open position and said cradle is disengaged from said bracket.

7. The bearing assembly of claim 2 wherein said cradle has a lower wall having a recess in a central portion thereof, and said mounting bracket has a protrusion which is located in said recess to secure said cradle in position relative to said bracket.

8. The bearing assembly of claim 2 wherein said first upwardly extending mounting leg has a hole formed therein adjacent the position of said lateral flange, and wherein said first end of said spring metal clip lock interlocks with said hole.

9. The bearing assembly of claim 8 wherein said second upwardly extending mounting leg has an overhanging lip formed thereon adjacent the position of said lateral flange, and wherein said second end of said clip lock interlocks with said overhanging lip.

10. The bearing assembly of claim 2 wherein said second upwardly extending mounting leg has an overhanging lip formed thereon adjacent the position of said lateral flange, and wherein said second end of said clip lock interlocks with said overhanging lip.

11. The bearing assembly of claim 1 wherein said cut-out is trapezoidal.

12. The bearing assembly of claim 1 wherein said bent central portion is a semi-circular arch.

13. The bearing assembly of claim 1 wherein said bent central portion is in the form of a triangle or point.

14. The bearing assembly of claim 1 wherein said bent central portion is in the form of a rectangle or square.

15. The bearing assembly of claim 1 wherein said bushing is made of a carbon/graphite material.

* * * * *